(12) United States Patent
Nakamura

(10) Patent No.: US 10,840,709 B2
(45) Date of Patent: Nov. 17, 2020

(54) MANAGEMENT METHOD, MANAGEMENT DEVICE, DISTRIBUTED POWER SUPPLY, AND MANAGEMENT SYSTEM

(71) Applicant: KYOCERA Corporation, Kyoto (JP)

(72) Inventor: Kazutaka Nakamura, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 84 days.

(21) Appl. No.: 16/313,463

(22) PCT Filed: Jun. 5, 2017

(86) PCT No.: PCT/JP2017/020765
§ 371 (c)(1),
(2) Date: Dec. 27, 2018

(87) PCT Pub. No.: WO2018/003408
PCT Pub. Date: Jan. 4, 2018

(65) Prior Publication Data
US 2019/0157877 A1 May 23, 2019

(30) Foreign Application Priority Data
Jun. 28, 2016 (JP) .................. 2016-127625

(51) Int. Cl.
*H02J 3/46* (2006.01)
*H02J 3/38* (2006.01)
(Continued)

(52) U.S. Cl.
CPC .................. *H02J 3/46* (2013.01); *H02J 3/14* (2013.01); *H02J 3/38* (2013.01); *H02J 13/00* (2013.01);
(Continued)

(58) Field of Classification Search
CPC .... H02J 13/00; H02J 3/383; H02J 3/12; H02J 3/38; Y04S 10/123; H02M 7/66; Y02E 10/763; Y02E 40/72
See application file for complete search history.

(56) References Cited

U.S. PATENT DOCUMENTS

2010/0217453 A1  8/2010 Itoh et al.
2017/0086281 A1* 3/2017 Avrahamy ............. A01G 7/045
2018/0367471 A1* 12/2018 Tang ................... H04W 72/048

FOREIGN PATENT DOCUMENTS

JP  2010-128810 A  6/2010
JP  2012-175795 A  9/2012
(Continued)

*Primary Examiner* — Jared Fureman
*Assistant Examiner* — Duc M Pham
(74) *Attorney, Agent, or Firm* — Hauptman Ham, LLP

(57) ABSTRACT

A management method comprises: a step A of transmitting, from a management device to a distributed power supply which operates in a first state in which a reverse power flow from a facility to a power grid is not permitted, a permission message permitting to operate in a second state in which the reverse power flow is permitted; a step B of switching by the distributed power supply, the operation of the first state to the operation of the second state after receiving the permission message; and a step C of switching by the distributed power supply, the operation of the second state to the operation of the first state, even when switching from the operation of the second state to the operation of the first state is not instructed, if a predetermined condition is satisfied.

19 Claims, 12 Drawing Sheets

(51) Int. Cl.
*H02J 13/00* (2006.01)
*H02J 3/14* (2006.01)
*H02J 3/32* (2006.01)
*H02M 7/66* (2006.01)

(52) U.S. Cl.
CPC ............... *H02J 3/32* (2013.01); *H02J 3/383* (2013.01); *H02M 7/66* (2013.01); *Y02E 10/76* (2013.01); *Y02E 40/70* (2013.01); *Y04S 10/123* (2013.01)

(56) References Cited

FOREIGN PATENT DOCUMENTS

| JP | 2013-188087 A | 9/2013 |
| JP | 2014-14223 A | 1/2014 |
| JP | 2015219202 A | 12/2015 |

* cited by examiner

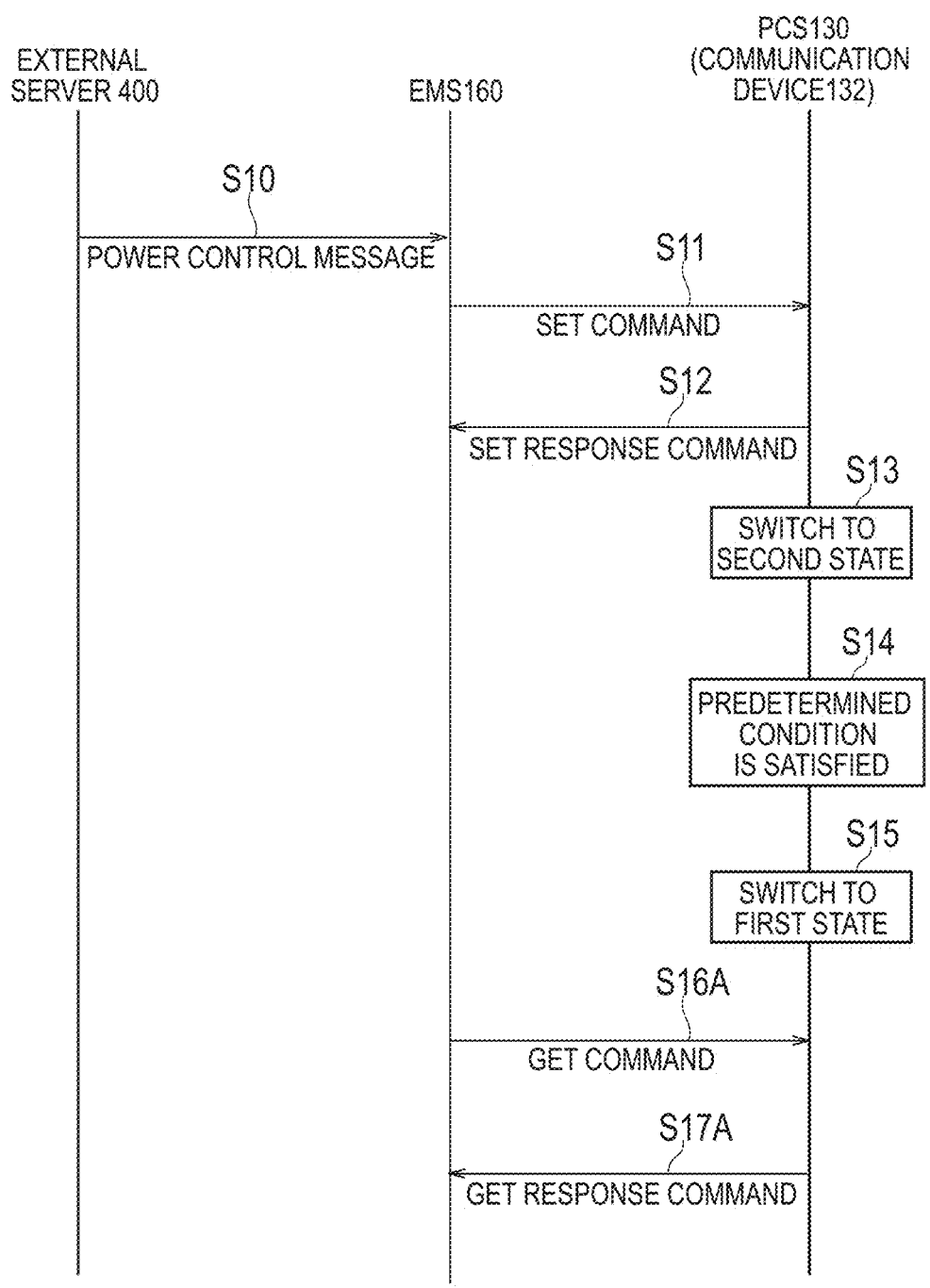

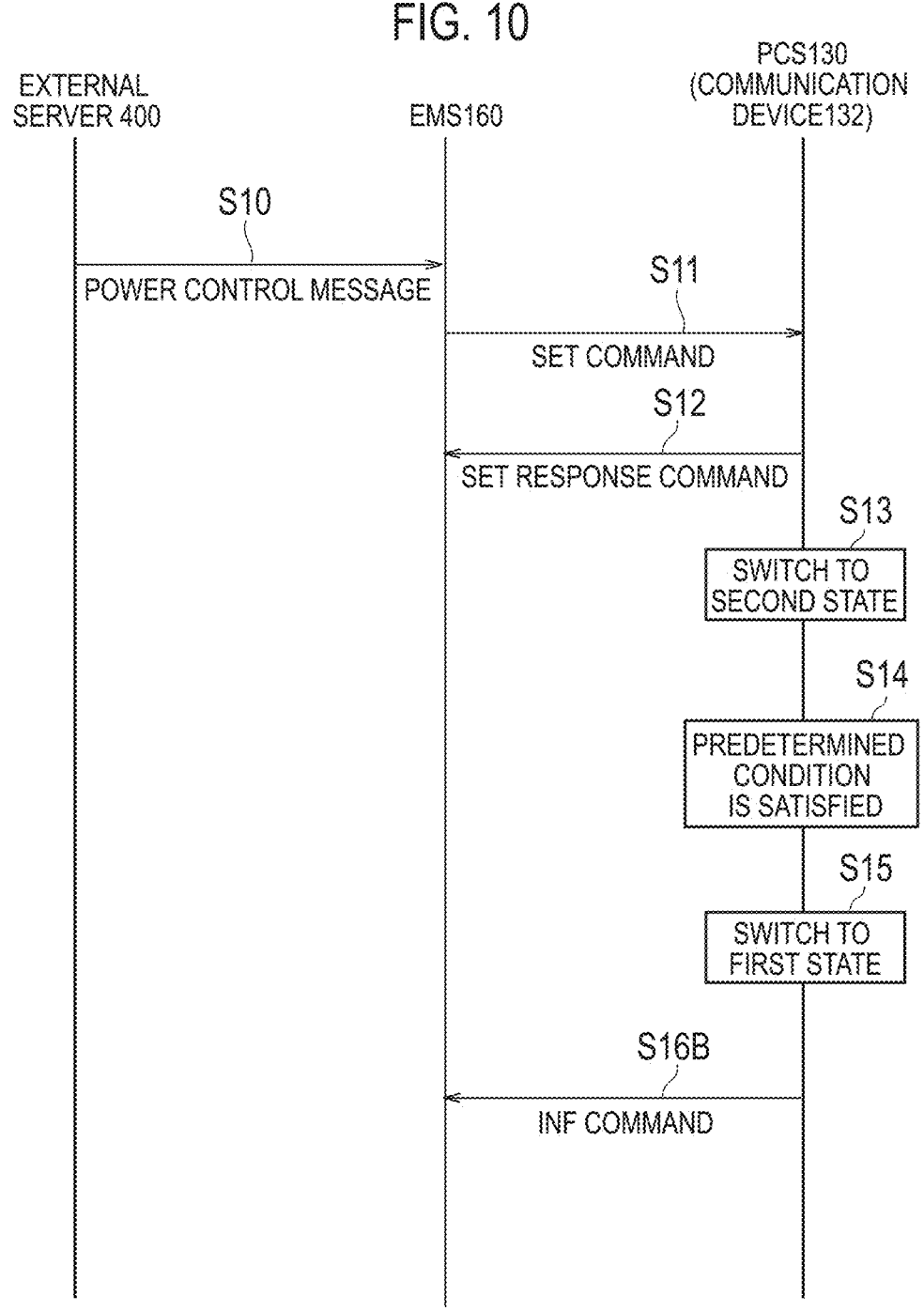

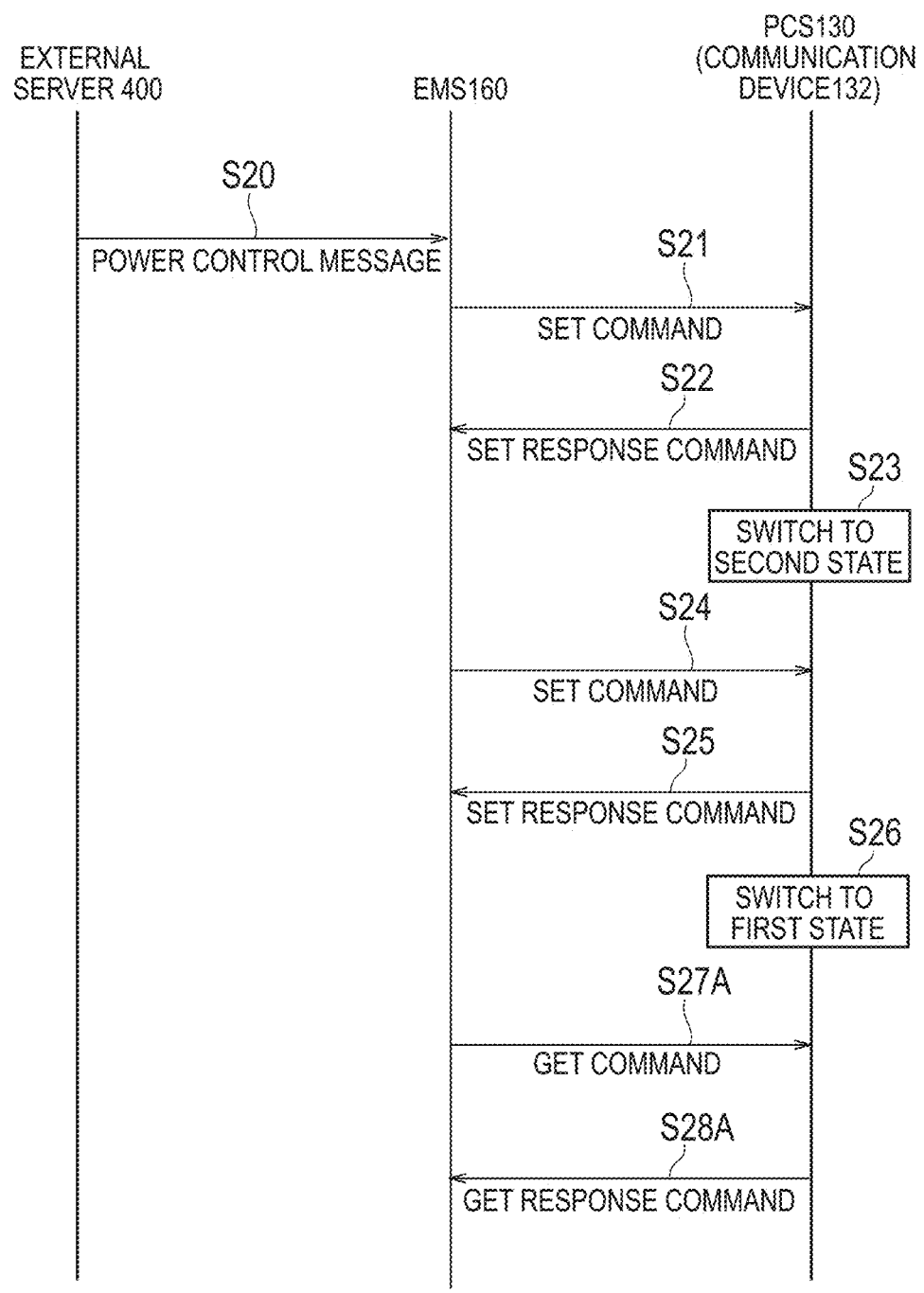

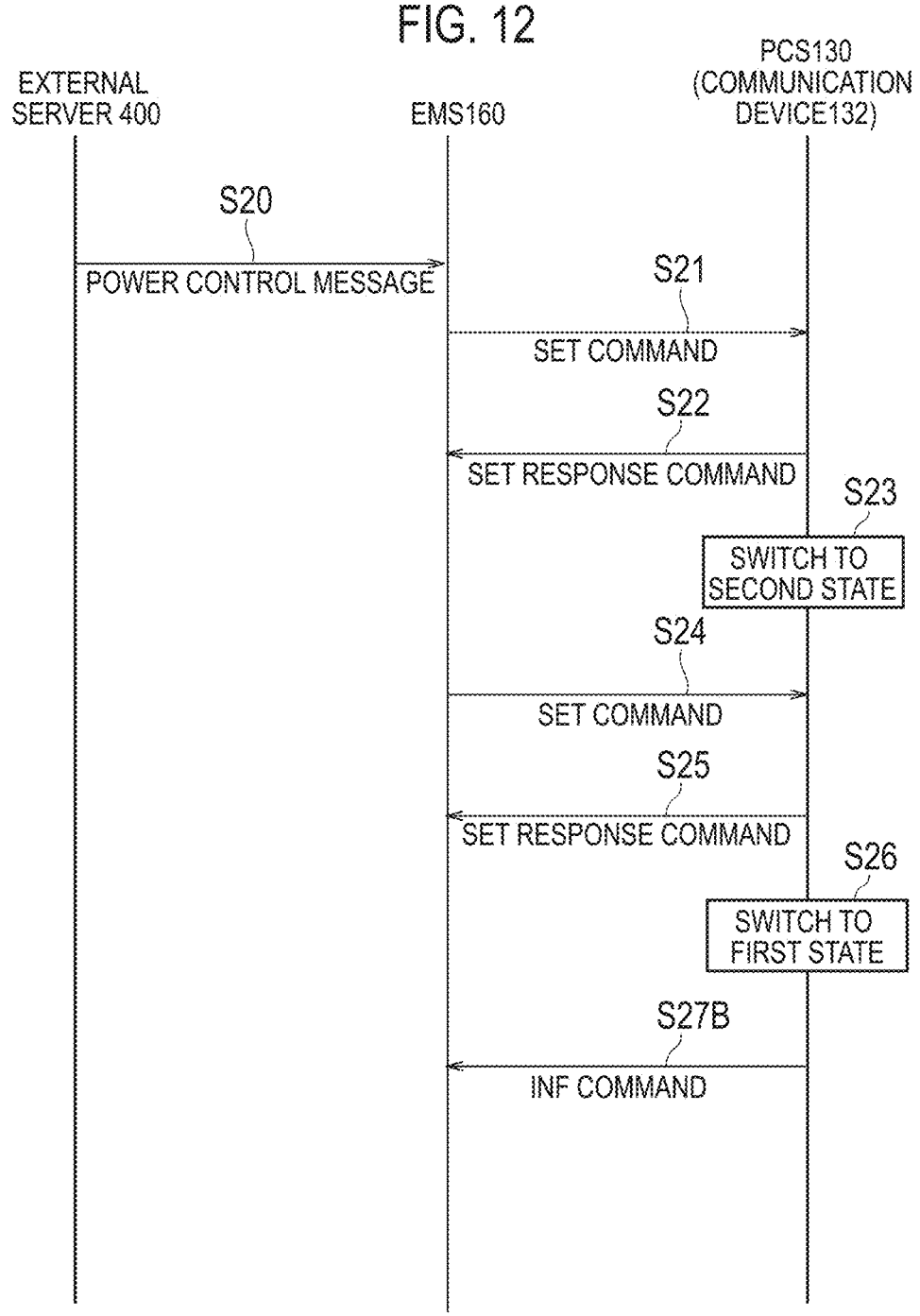

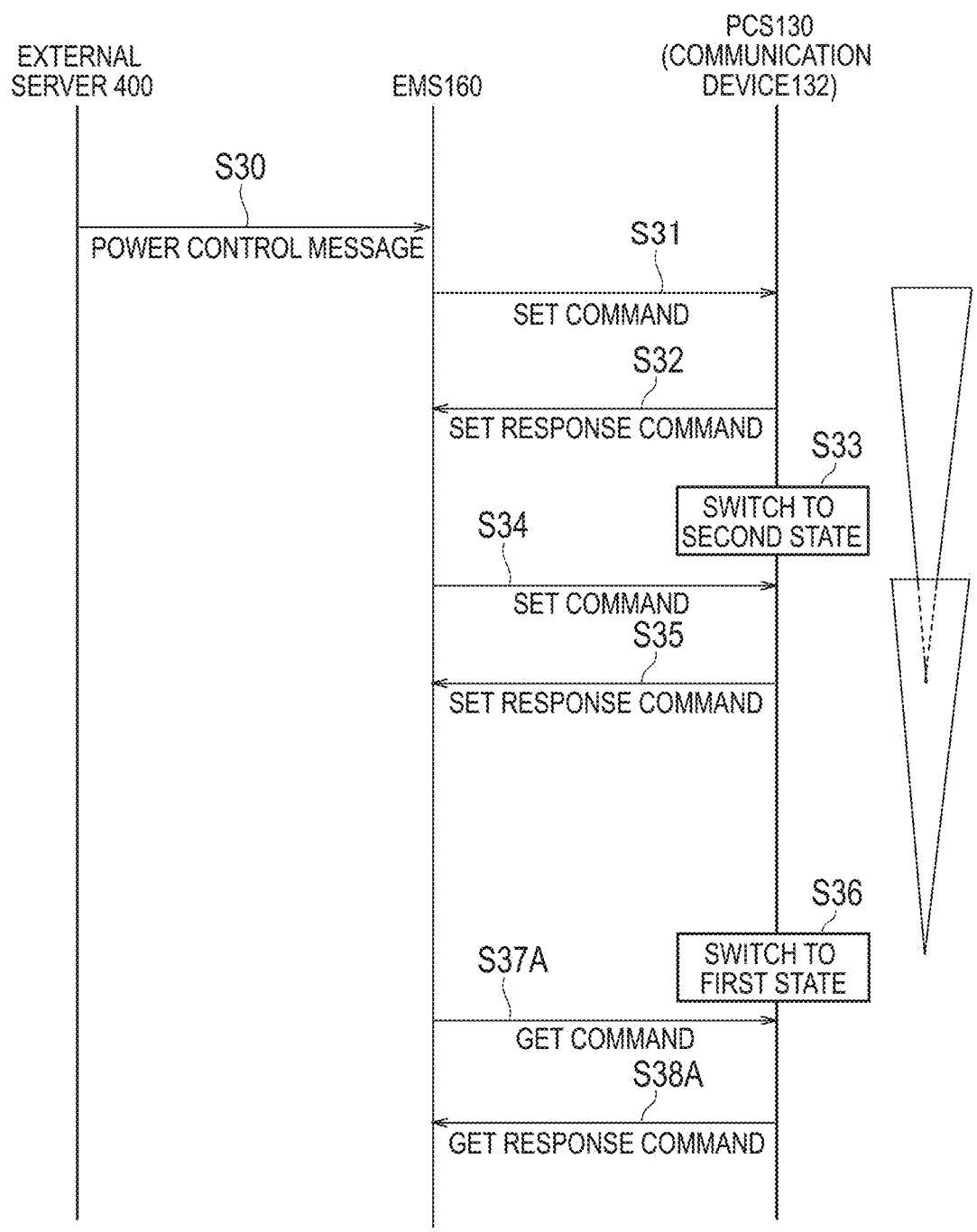

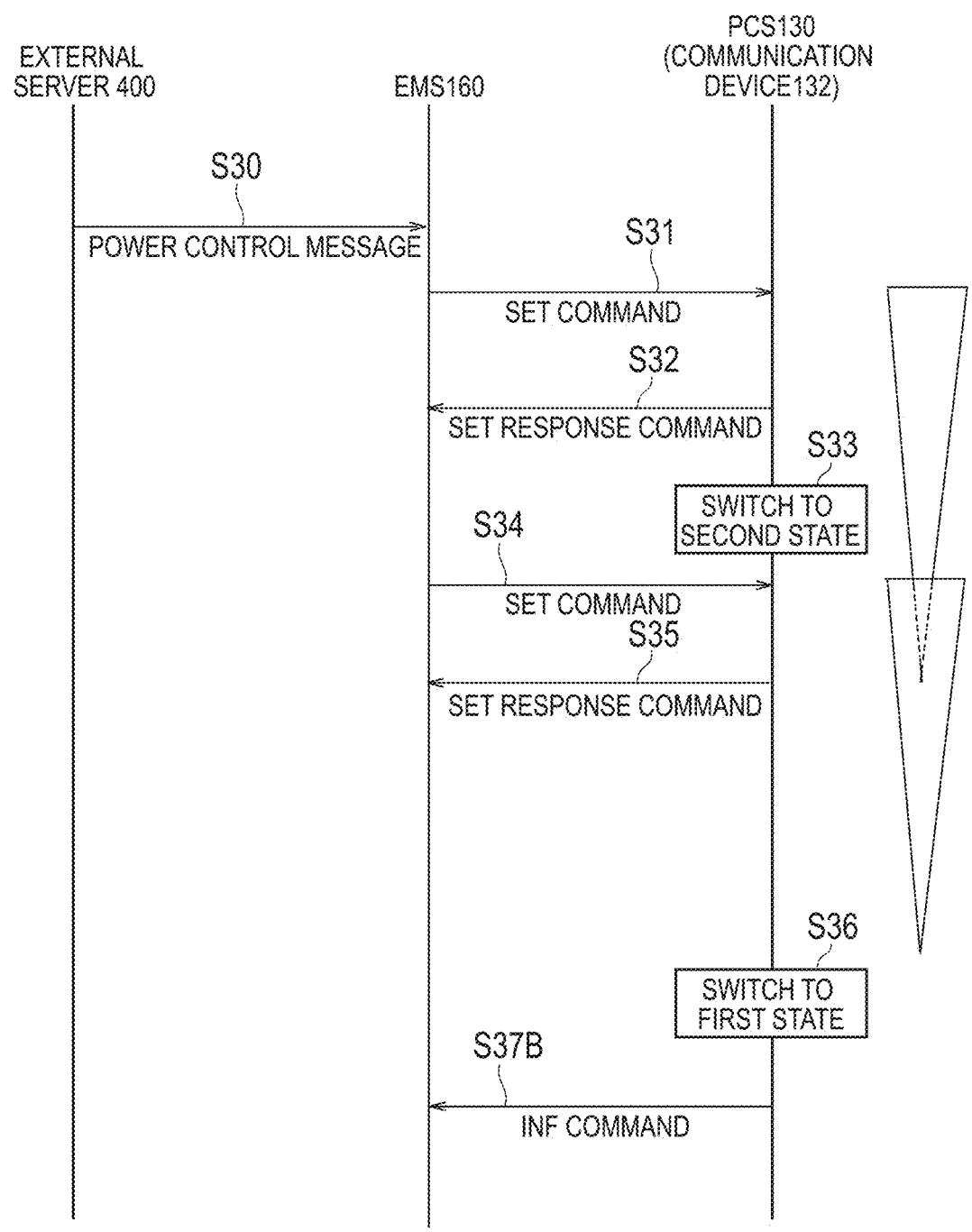

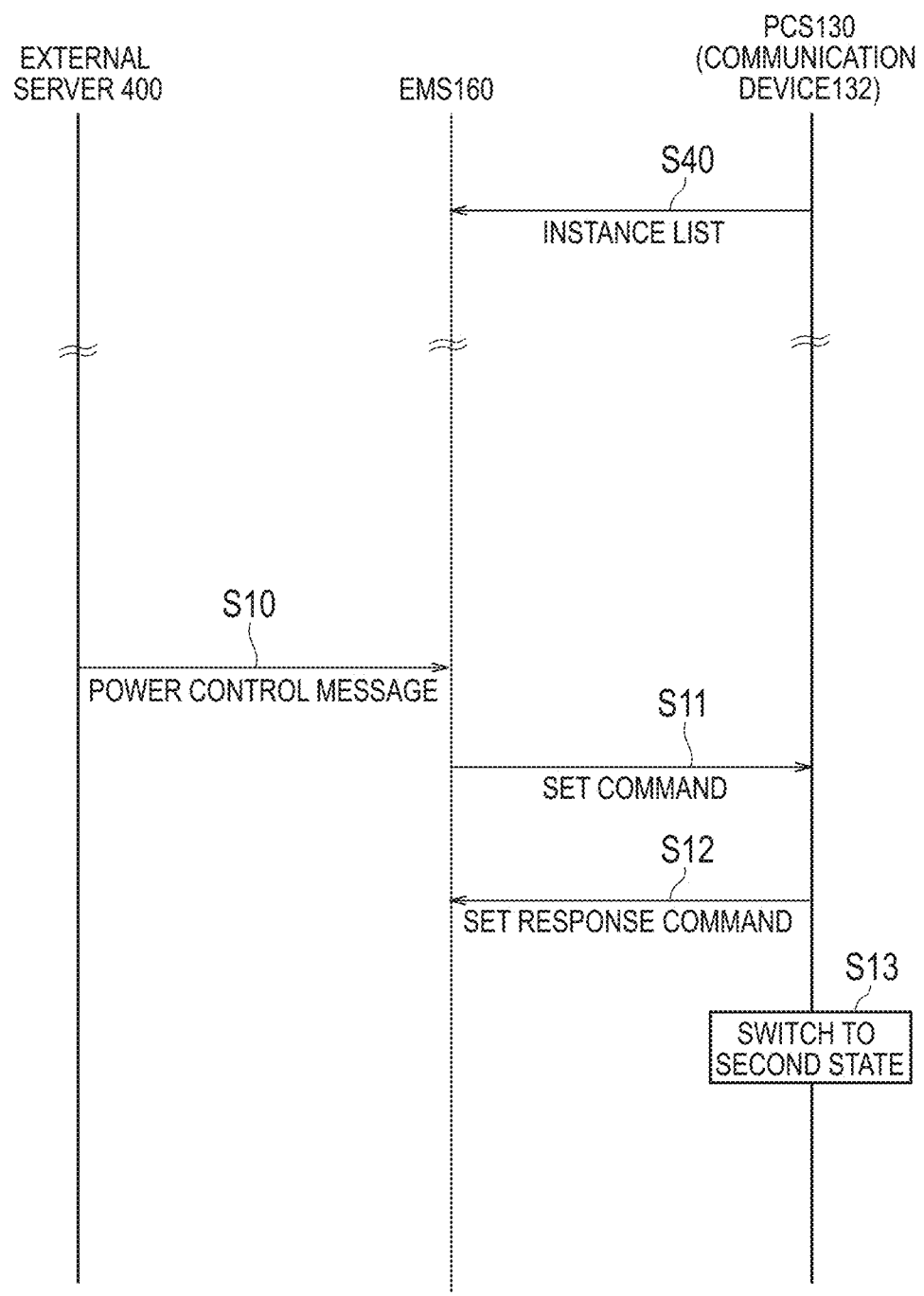

MANAGEMENT METHOD, MANAGEMENT DEVICE, DISTRIBUTED POWER SUPPLY, AND MANAGEMENT SYSTEM

RELATED APPLICATIONS

The present application is a National Phase of PCT/JP2017/020765, filed Jun. 5, 2017, and claims priority based on Japanese Patent Application No. 2016-127625, filed Jun. 28, 2016.

TECHNICAL FIELD

The present disclosure relates to a management method, a management device, a distributed power supply, and a management system.

BACKGROUND ART

Recently, techniques for adjusting the power supply and demand balance of a power grid by using a distributed power supply provided in facilities have attracted attention. Examples of such a distributed power supply include power supplies using natural energy (a photovoltaic power generation device, a wind power generation device, and a hydraulic power generation device).

In addition, a management system including a device and a management device for managing the device has been proposed. The management system is referred to as a home energy management system (HEMS), a store energy management system (SEMS), a building energy management system (BEMS), a factory energy management system (FEMS), a cluster/community Energy Management System (CEMS), and the like according to an object to be managed.

In order to spread the above-described management system, it is effective to share the communication standards between the device and the management device, and attempts have been made to standardize such communication standards.

By the way, there is a need to temporarily use a distributed power supply which operates in a state in which a reverse power flow from a facility to a power grid is not permitted. In order to realize such a need, various studies are required for the communication standard used in the above-described management system.

CITATION LIST

Patent Literature

Patent Literature 1: JP 2010-128810 A

SUMMARY OF INVENTION

A first aspect is related to a management method. The management method comprises: a step A of transmitting, from a management device to a distributed power supply which operates in a first state in which a reverse power flow from a facility to a power grid is not permitted, a permission message permitting to operate in a second state in which the reverse power flow is permitted; a step B of switching by the distributed power supply, the operation of the first state to the operation of the second state after receiving the permission message; and a step C of switching by the distributed power supply, the operation of the second state to the operation of the first state, even when switching from the operation of the second state to the operation of the first state is not instructed, if a predetermined condition is satisfied.

A second aspect is related to a management device. The management device comprises: a transmitter configured to transmit to a distributed power supply which operates in a first state in which a reverse power flow from a facility to a power grid is not permitted, a permission message permitting to operate in a second state in which the reverse power flow is permitted. The distributed power supply is configured to switch the operation of the first state to the operation of the second state after receiving the permission message. The distributed power supply is configured to switch the operation of the second state to the operation of the first state, even when switching from the operation of the second state to the operation of the first state is not instructed, if a predetermined condition is satisfied.

A third aspect is related to a distributed power supply which operates in a first state in which a reverse power flow from a facility to a power grid is not permitted. The distributed power supply comprises a receiver configured to receive a permission message permitting operation in a second state in which the reverse power flow is permitted; and a controller configured to switch the operation of the first state to the operation of the second state after receiving the permission message. The controller is further configured to switch the operation of the second state to the operation of the first state, even when switching from the operation of the second state to the operation of the first state is not instructed, if a predetermined condition is satisfied.

A fourth aspect is related to a management system comprising a distributed power supply and a management device. The management device is configured to transmit to the distributed power supply which operates in a first state in which a reverse power flow from a facility to a power grid is not permitted, a permission message permitting to operate in a second state in which the reverse power flow is permitted. The distributed power supply is configured to switch the operation of the first state to the operation of the second state after receiving the permission message. The distributed power supply is configured to switch the operation of the second state to the operation of the first state, even when switching from the operation of the second state to the operation of the first state is not instructed, if a predetermined condition is satisfied.

BRIEF DESCRIPTION OF DRAWINGS

FIG. 9 is a sequence diagram illustrating a management method according to an embodiment.

FIG. 10 is a sequence diagram illustrating a management method according to an embodiment.

FIG. 11 is a sequence diagram illustrating a management method according to modification 1.

FIG. 12 is a sequence diagram illustrating a management method according to modification 1.

FIG. 13 is a sequence diagram illustrating a management method according to modification 2.

FIG. 14 is a sequence diagram illustrating a management method according to modification 2.

FIG. 15 is a sequence diagram illustrating a management method according to modification 3.

DESCRIPTION OF EMBODIMENTS

Figure 1:
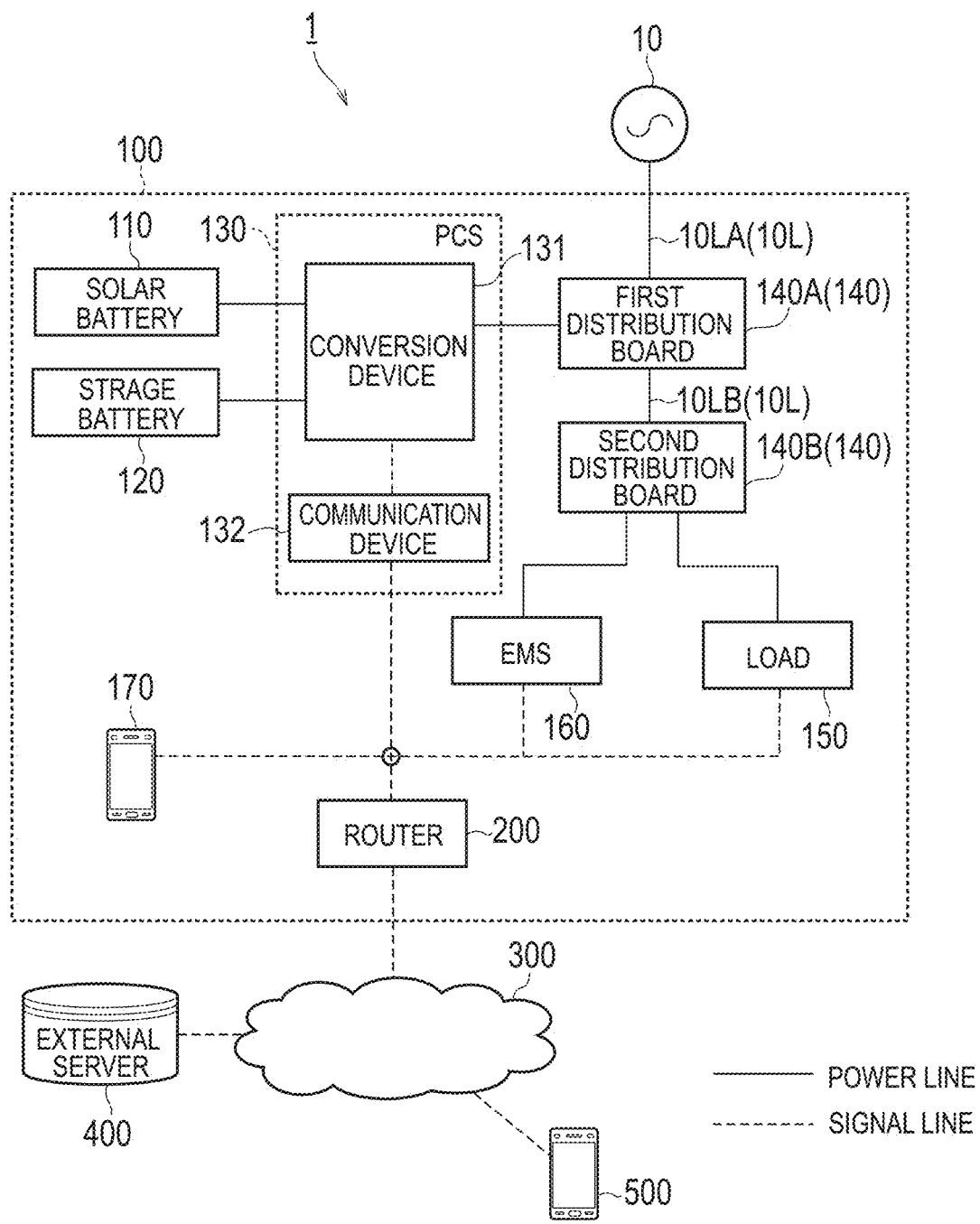
FIG. 1 is a diagram illustrating a management system 1 according to an embodiment.

Hereinafter, an embodiment will be described with reference to the drawings. In the following description of the drawings, the same or similar reference numerals are assigned to the same or similar parts.

However, the drawings are schematic and ratios of dimensions and the like may be different from actual ones. Therefore, concrete dimensions and the like should be determined with reference to the following explanation. The drawings may include portions having different dimensional relationships or ratios.

Embodiment (Management System)

Hereinafter, a management system according to an embodiment will be described. As illustrated in FIG. 1, the management system 1 includes a facility 100, an external server 400, and a user terminal 500. The facility 100 includes a router 200. The router 200 is connected to the external server 400 via a network 300. The router 200 constitutes a local area network and is connected to each device (for example, a communication device 132 of a PCS 130, a load 150, an EMS 160, a display device 170, and the like). In FIG. 1, a solid line indicates a power line, and a dashed line indicates a signal line. It should be noted that the present disclosure is not limited thereto, and the signal may be transmitted through the power line.

The facility 100 includes a solar cell 110, a storage battery 120, the PCS 130, a distribution board 140, the load 150, the EMS 160, and the display device 170.

The solar cell 110 is a device that generates power in response to light reception. The solar cell 110 outputs the generated DC power. The power generation amount of the solar cell 110 varies according to the amount of solar radiation applied to the solar cell 110. In the embodiment for example, the solar cell 110 constitutes a distributed power supply that operates in a state in which power is allowed to flow (reverse power flow) in a first direction from the facility 100 to the power grid 10, together with a part of the functions of the PCS 130. It should be noted that the first direction is defined as a direction different from a second direction (forward power flow) that is a direction to purchase power from the power grid 10.

The storage battery 120 is a device that accumulates power. The storage battery 120 outputs the accumulated DC power. In the embodiment for example, the storage battery 120 constitutes a distributed power supply that operates in a state in which a reverse power flow from the facility 100 to the power grid 10 is not permitted, together with a part of the functions of the PCS 130. However, the storage battery 120 may operate in a state in which the reverse power flow is temporarily permitted.

The PCS 130 is an example of a power conditioning system (PCS) that converts at least one of the output power from the distributed power supply and the input power to the distributed power supply into AC power or DC power. In the embodiment, the PCS 130 includes a conversion device 131 and a communication device 132. In the embodiment the PCS 130 is an example of a unit including the conversion device 131.

The conversion device 131 converts DC power from the solar cell 110 into AC power and converts DC power from the storage battery 120 into AC power. Furthermore, the conversion device 131 converts AC power from the power grid 10 into DC power. The conversion device 131 is connected to a main power line 10L (here, a main power line 10LA and a main power line 10LB) connected to the power grid 10 via a first distribution board 140A, and is connected to both the solar cell 110 and the storage battery 120. The main power line 10LA is a power line that connects the power grid 10 and the first distribution board 140A, and the main power line 10LB is a power line that connects the first distribution board 140A and the second distribution board 140B. In the present embodiment, the conversion device 131 will be described with respect to a hybrid type power conversion device connected to the solar cell 110 and the storage battery 120, but the conversion device 131 may be configured such that the power conversion device is connected to each of the solar cell 110 and the storage battery 120. If the power conversion device is connected to each of the solar cell 110 and the storage battery 120, each of the power conversion devices can perform control similar to that of the hybrid type power conversion device of the present embodiment.

The communication device 132 is connected to the conversion device 131, receives various messages to the conversion device 131, and transmits various messages from the conversion device 131. In the communication between the communication device 132 and the conversion device 131, a protocol (for example, a proprietary protocol) applied to the PCS 130 may be used.

In the embodiment the communication device 132 is connected to the router 200 by wire or wirelessly. The communication device 132 is connected to the external server 400 via the router 200, and receives, from the external server 400, an output suppression message instructing to suppress the output of the distributed power supply. Secondly, the communication device 132 is connected to the EMS 160 via the router 200, and performs communication of a predetermined command having a predetermined format with the EMS 160. The predetermined format is not particularly limited, and, for example, an ECHONET scheme, an ECHONET Lite scheme, a SEP 2.0 scheme, a KNX scheme, or the like can be used.

For the predetermined format, for example, a format conforming to the ECHONET Lite scheme will be described. In such a case, the predetermined command can be roughly divided into, for example, a request command, a request response command that is a response to the request command, or an information notification command. The request command is, for example, a SET command or a GET command. The request response command is, for example, a SET response command that is a response to the SET command, or a GET response command that is a response to the GET command. The information notification command is, for example, an INF command.

The SET command is a command including a property for instructing the setting or operation of the PCS 130. The SET response command is a command indicating that the SET command has been received. The GET command is a command including a property indicating the state of the PCS 130 and used for acquiring the state of the PCS 130. The GET response command is a command including a property indicating the state of the PCS 130 and including information requested by the GET command. The INF command is a command including a property indicating the state of the PCS 130 and used for notifying the state of the PCS 130.

The distribution board 140 is connected to the main power line 10L. The distribution board 140 includes the first distribution board 140A and the second distribution board 140B. The first distribution board 140A is connected to the power grid 10 via the main power line 10LA and is also connected to the solar cell 110 and the storage battery 120 via the conversion device 131. In addition, the first distribution board 140A controls the power output from the conversion device 131 and the power supplied from the power grid 10 such that the power flow through the main power line 10LB. The power flowing from the main power line 10LB is distributed to each device (here, the load 150 and the EMS 160) by the second distribution board 140B.

The load 150 is a device that consumes the power supplied via the power line. For example, the load 150 includes devices such as air conditioners, lighting devices, refrigerators, and televisions. The load 150 may be a single device or a plurality of devices.

The EMS 160 is a device (energy management system (EMS)) that manages power information indicating power in the facility 100. The power in the facility 100 refers to power flowing through the facility 100, power to be purchased by the facility 100, power to be sold from the facility 100, or the like. Therefore, for example, the EMS 160 manages at least the PCS 130.

The EMS 160 may control the power generation amount of the solar cell 110, the charge amount of the storage battery 120, and the discharge amount of the storage battery 120. The EMS 160 may be integrated with the distribution board 140. The EMS 160 is a device connected to the network 300, and the function of the EMS 160 may be provided via the network 300 by a cloud service.

In the embodiment the EMS 160 is connected to each device (for example, the communication device 132 of the PCS 130 and the load 150) via the router 200, and performs communication of a predetermined command having a predetermined format with each device.

The EMS 160 is connected to the display device 170 via the router 200, and communicates with the display device 170. The EMS 160 may perform communication of a predetermined command having a predetermined format with the display device 170. As described above, the predetermined format is, for example, a format conforming to the ECHONET Lite scheme.

The display device 170 displays the state of the PCS 130. The display device 170 may display power information indicating power in the facility 100. The display device 170 is, for example, a smartphone, a tablet, a television, a personal computer, or a dedicated terminal. The display device 170 is connected to the EMS 160 by wired or wirelessly and performs communication with the EMS 160. The display device 170 may perform communication of a predetermined command having a predetermined format with the EMS 160. The display device 170 receives, from the EMS 160, data necessary for displaying a variety of information.

The network 300 is a communication network that connects the EMS 160 and the external server 400. The network 300 may be a public communication line such as the Internet. The network 300 may include a mobile communication network. In addition, the network 300 may be a dedicated communication line or a general communication line. For example, if the output of the solar cell 110 is equal to or higher than a predetermined output, the output suppression can be more reliably performed by using the dedicated communication line as the network 300.

The external server 400 is a server managed by a business operator such as a power generation company, a power transmission/distribution company, or a retailer. For example, the business operator designates the output suppression of the distributed power supply and is, for example, a business operator such as a power generation company, a power transmission/distribution company, a retailer, or a group management company of a distributed power supply. Specifically, the external server 400 transmits an output suppression message instructing to suppress the output of the distributed power supply. The external server 400 may transmit a forward power flow suppression message (DR; Demand Response) instructing the suppression of the forward power flow amount from the power grid 10 to the facility 100.

The output suppression message includes a target output suppression level indicating the level of the output suppression of the distributed power supply (here, the solar cell 110). The target output suppression level is determined according to the output (hereinafter, the facility certified output [kW]) approved as the output capability (for example, the rated output) of the PCS that controls the distributed power supply. The distributed power supply may be the storage battery 120 and a fuel cell. The output suppression message may include calendar information indicating the schedule of the output suppression of the distributed power supply. In the calendar information, the schedule of the output suppression of the distributed power supply can be set in units of 30 minutes. The calendar information may include a schedule for one day, may include a schedule for one month, or may include a schedule for one year.

In the embodiment the external server 400 transmits, to the PCS 130, a power control message for controlling the conversion device 131 via the EMS 160. The power control message may be a message for controlling the conversion device 131, may be a message instructing to increase or decrease the output of the solar cell 110, or may be a message instructing the storage or discharge of the storage battery 120. In addition, the power control message may be an output suppression message and a forward power flow suppression message, but the output suppression message or the forward power flow suppression message may be transmitted from the external server 400 to the PCS 130 without passing through the EMS 160.

The user terminal 500 transmits a power control message for controlling the conversion device 131 via the EMS 160. The user terminal 500 is, for example, a smartphone, a tablet, or a dedicated terminal. The user terminal 500 may be a terminal possessed by a user who uses the solar cell 110, the storage battery 120, or the PCS 130, or may be a terminal possessed by a business operator who is responsible for maintenance of the solar cell 110, the storage battery 120, or the PCS 130. The power control message may be a message for controlling the conversion device 131, may be a message instructing to increase or decrease the output of the solar cell 110, or may be a message instructing the storage or discharge of the storage battery 120.

In FIG. 1, the user terminal 500 is connected to the EMS 160 via the network 300 and the router 200, but the embodiment is not limited thereto. The user terminal 500 is located within the facility 100 and may be connected to the EMS 160 via the router 200 without passing through the network 300. For example, the user terminal 500 may be the above-described display device 170. It should be noted that the user terminal 500 may be connected to the EMS 160 through the router 200 via the network 300.

(Application Scene)

As described above, the distributed power supply provided in the facility 100 can include not only a distributed power supply (for example, the solar cell 110) in which a reverse power flow backward from the facility 100 to the power grid 10 is permitted, but also a distributed power supply (for example, the storage battery 120) in which a reverse power flow from the facility 100 to the power grid 10 is not permitted. Under such circumstances, there is a need to use not only the distributed power supply, in which the reverse power flow from the facility 100 to the power grid 10 is permitted, but also the distributed power supply, in which the reverse power flow from the facility 100 to the power grid 10 is not permitted, as the distributed power supply capable of the reverse power flow depending on the power supply and demand balance of the power grid 10. As a more specific need, it is conceivable to use the distributed power supply owned by the facility 100 as a virtual power plant collectively used for the plurality of facilities 100. In order to realize such a need, various studies are required for the communication standard used in the above-described management system 1.

In the embodiment under limited conditions, a permission message is newly defined which permits an operation in a state in which a reverse power flow is permitted. In the ECHONET Lite scheme, for example, one of the above-mentioned SET commands can be used as the permission message.

Specifically, the EMS 160 transmits the permission message to the storage battery 120 which operates in a first state in which the reverse power flow is not permitted, the permission message permitting the storage battery 120 to operate in a second state in which the reverse power flow is permitted. In the embodiment since the storage battery 120 is controlled by the PCS 130, the transmission of the message to the storage battery 120 may be regarded as synonymous with the transmission of the message to the PCS 130. In the following description, it is assumed that the message to the storage battery 120 is transmitted to the PCS 130.

Although not particularly limited, for example, if the power demand in the power grid 10 is greater than the power supply, the EMS 160 may transmit the permission message to the PCS 130. For example, if the forward power flow amount suppression message is received from the external server 400, the EMS 160 may transmit the permission message to the PCS 130.

The storage battery 120 switches the operation of the first state to the operation of the second state after the reception of the permission message under the control of the PCS 130. A time which can be switched to the operation of the second state, a start time, or an end time may be included in the permission message. If such a time is included in the permission message, the operation of the first state is switched to the operation of the second state within a switchable time.

The storage battery 120 may switch the operation of the first state to the operation of the second state in response to the reception of the permission message. After the reception of the permission message, the storage battery 120 may switch the operation of the first state to the operation of the second state in response to reception of a message instructing the discharge of the storage battery 120.

Even when switching from the operation of the second state to the operation of the first state is not instructed, if a predetermined condition is satisfied, the storage battery 120 switches the operation of the second state to the operation of the first state under the control of the PCS 130 (that is, the operation of the second state is stopped). That is, the storage battery 120 autonomously stops the operation of the second state without receiving a special instruction from the EMS 160.

Under such an assumption, the EMS 160 may transmit, to the PCS 130, a message designating a predetermined condition (hereinafter, referred to as a condition designation message). The predetermined condition may be that the time for which the storage battery 120 continues the operation of the second state reaches a predetermined time, and the condition designation message includes information indicating the predetermined time. The predetermined condition may be that the cumulative output of the storage battery 120 reaches a predetermined output, and the condition designation message includes information indicating the predetermined output. The "output" is represented by, for example, Wh or kWh.

Although not particularly limited, a timing to transmit the condition designation message from the EMS 160 may be the same timing as the permission message or before the permission message. If the condition designation message is transmitted at the same timing as the permission message, the condition designation message and the permission message may be one message. For example, the permission message may include information specifying the predetermined condition.

(Communication Device)

Figure 2:
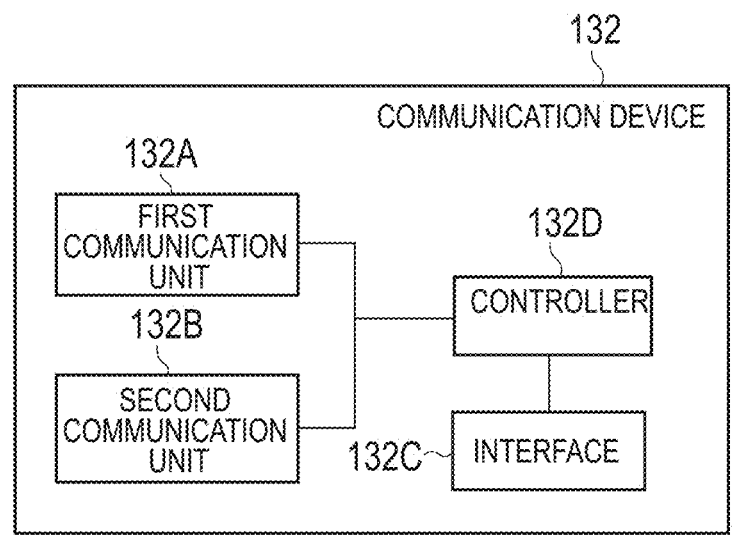
FIG. 2 is a diagram illustrating a communication device 132 according to an embodiment.

Hereinafter, the communication device according to an embodiment will be described. As illustrated in FIG. 2, the communication device 132 includes a first communication unit 132A, a second communication unit 132B, an interface 132C, and a controller 132D. The communication device 132 (that is, the PCS 130) is an example of a device.

The first communication unit 132A receives the output suppression message or the forward power flow amount suppression message from the external server 400. In the embodiment the first communication unit 132A may receive the output suppression message or the forward power flow amount suppression message without passing through the EMS 160, and may receive the output suppression message or the forward power flow amount suppression message via the EMS 160.

The second communication unit 132B performs communication of a predetermined command having a predetermined format with the EMS 160. As described above, the predetermined format is, for example, a format conforming to the ECHONET Lite scheme. Here, the predetermined format used for the communication between the communication device 132 (the second communication unit 132B) and the EMS 160 may be different from the format used for the communication between the communication device 132 (the first communication unit 132A) and the external server 400. In addition, the predetermined format used for the communication between the second communication unit 132B (the second communication unit 132B) and the EMS 160 may be different from the format used for the communication between the communication device 132 (the interface 132C) and the conversion device 131.

The interface 132C is an interface with the conversion device 131. The interface 132C may be a wired interface or a radio interface. In the communication between the communication device 132 and the conversion device 131, a protocol (for example, a proprietary protocol) applied to the PCS 130 may be used.

The controller 132D includes a memory and a CPU and controls the communication device 132. For example, the controller 132D controls the conversion device 131 by using the interface 132C, so as to control the output of the distributed power supply according to the output suppression message. Using the interface 132C, the controller 132D acquires, from the conversion device 131, the state of the conversion device 131 (for example, the power generation amount of the solar cell 110, the power storage amount of the storage battery 120, and the discharge amount of the storage battery 120). The controller 132D generates a command for controlling the conversion device 131 based on the command received from the EMS 160 and outputs the command to the conversion device 131 by using the interface 132C.

(Management Device)

Figure 3:
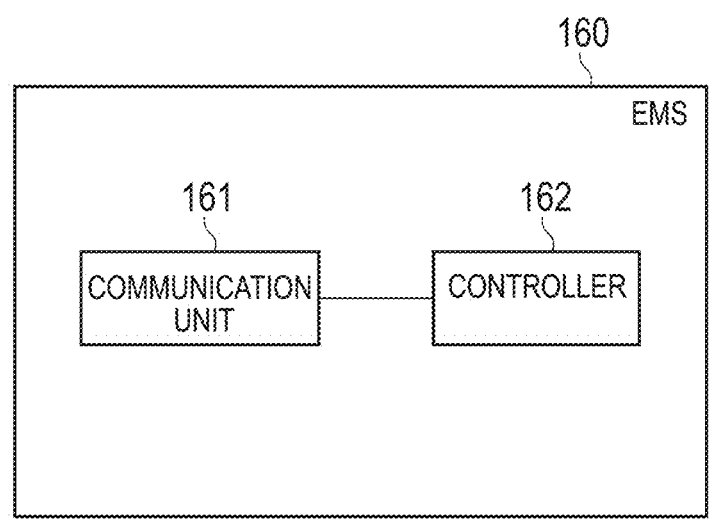
FIG. 3 is a diagram illustrating an EMS 160 according to an embodiment.

Hereinafter, a management device according to an embodiment will be described. As illustrated in FIG. 3, the EMS 160 includes a communication unit 161 and a controller 162.

The communication unit 161 performs communication of a predetermined command having a predetermined format with the communication device 132 and the display device 170. As described above, the predetermined format is, for example, a format conforming to the ECHONET Lite scheme.

The controller 162 includes a memory and a CPU, and controls the EMS 160. The controller 162 may control the power generation amount of the solar cell 110, the charge amount of the storage battery 120, and the discharge amount of the storage battery 120.

(Message Format)

Hereinafter, a message format according to an embodiment will be described. Here, a case in which the predetermined format is a format conforming to the ECHONET Lite scheme will be exemplified.

Figure 4:
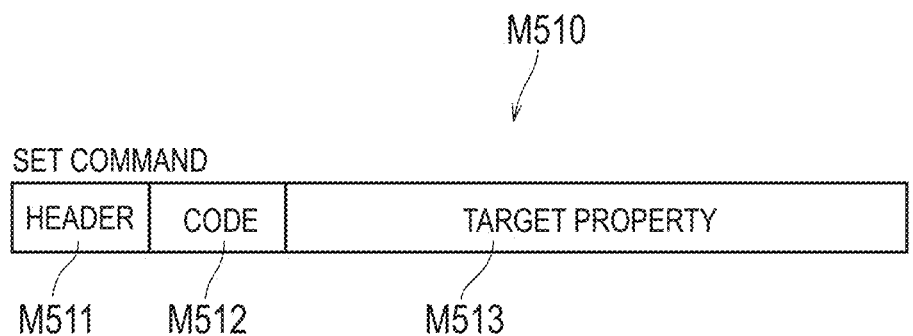
FIG. 4 is a diagram illustrating an example of a SET command according to an embodiment.

As illustrated in FIG. 4, a SET command M510 includes a header M511, a code M512, and a target property M513. In the embodiment the SET command M510 is an example of a command instructing the operation of the PCS 130 according to a power control message and is a command transmitted from the EMS 160 to the PCS 130. That is, the SET command M510 may be regarded as an example of the power control message.

The header M511 is information indicating the destination or the like of the SET command M510. The code M512 is information indicating a type of a message including the code M512. Here, the code M512 is information indicating that the message including the code M512 is the SET command. The target property M513 includes a property indicating an operation instructed to the PCS 130 by the EMS 160.

Figure 5:
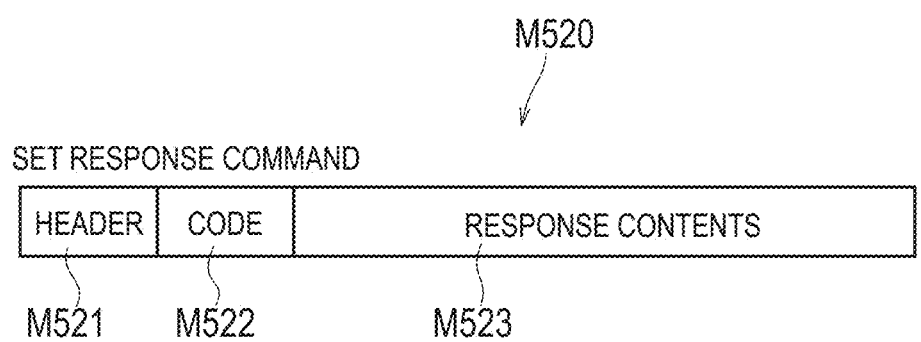
FIG. 5 is a diagram illustrating an example of a SET response command according to an embodiment.

As illustrated in FIG. 5, a SET response command M520 includes a header M521, a code M522, and response contents M523. In the embodiment the SET response command M520 is an example of a command transmitted from the PCS 130 to the EMS 160 in response to a command received from the EMS 160.

The header M521 is information indicating the destination or the like of the SET response command M520. The code M522 is information indicating a type of a message including the code M522. Here, the code M522 is information indicating that the message including the code M522 is the SET response command. The response contents M523 include information indicating that the SET command has been received. Such information may be a copy of the property included in the SET command, or may be an acknowledgement (ACK). In addition, such information is not limited thereto and may be a response (selective ACK) intended to correctly receive only part of data.

Figure 6:
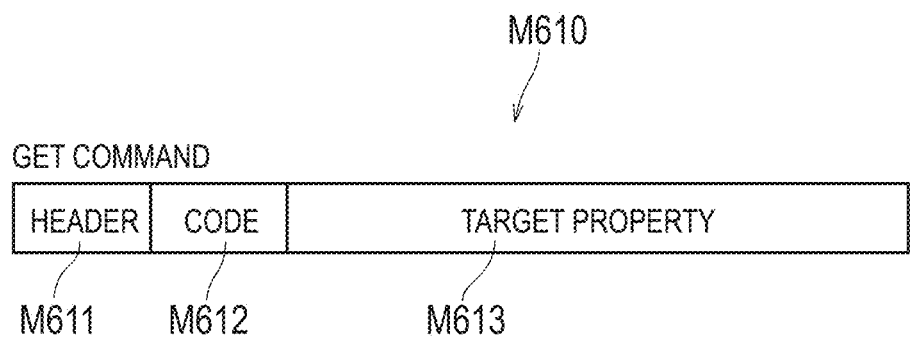
FIG. 6 is a diagram illustrating an example of a GET command according to an embodiment.

As illustrated in FIG. 6, a GET command M610 includes a header M611, a code M612, and a target property M613. In the embodiment the GET command M610 is an example of a command requesting the state of the PCS 130 and is an example of a command transmitted from the EMS 160 to the PCS 130.

The header M611 is information indicating the destination or the like of the GET command M610. The code M612 is information indicating a type of a message including the code M612. Here, the code M612 is information indicating that the message including the code M612 is the GET command. The target property M613 includes a property that the EMS 160 wants to know.

Figure 7:
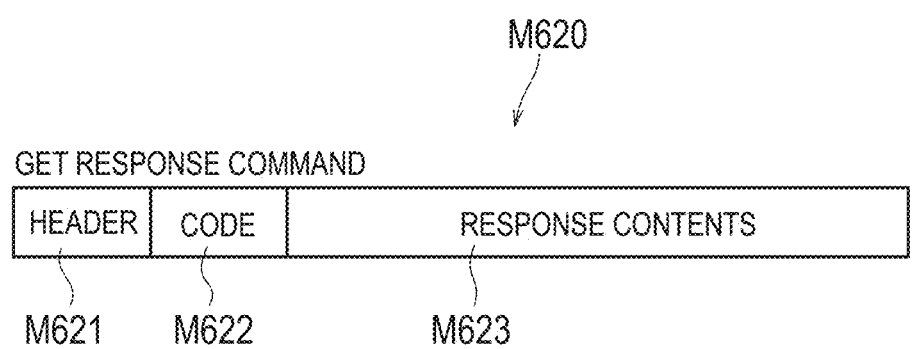
FIG. 7 is a diagram illustrating an example of a GET response command according to an embodiment.

As illustrated in FIG. 7, a GET response command M620 includes a header M621, a code M622, and response contents M623. In the embodiment the GET response command M620 is an example of a command transmitted from the PCS 130 to the EMS 160 in response to a command received from the EMS 160.

The header M621 is information indicating the destination or the like of the GET response command M620. The code M622 is information indicating a type of a message including the code M622. Here, the code M622 is information indicating that the message including the code M622 is the GET response command. The response contents M623 include a property requested by the GET command.

Figure 8:
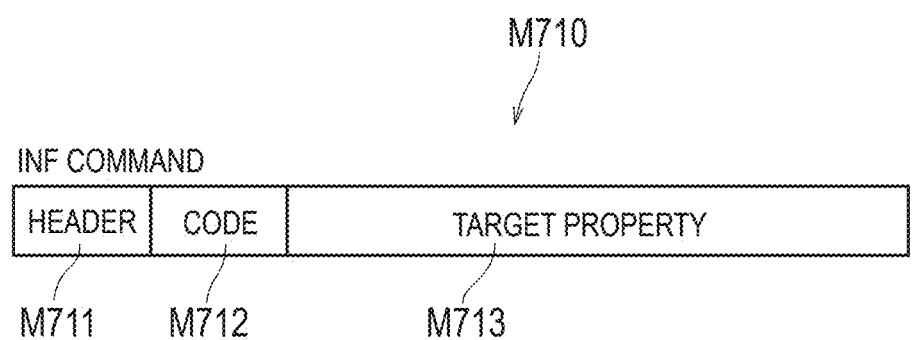
FIG. 8 is a diagram illustrating an example of an INF command according to an embodiment.

As illustrated in FIG. 8, an INF command M710 includes a header M711, a code M712, and a target property M713. In the embodiment the INF command M710 is an example of a command for notifying a transmission source to the display device 170 and is an example of a transmission source message transmitted from the EMS 160 to the display device 170.

The header M711 is information indicating the destination or the like of the INF command M710. The code M712 is information indicating a type of a message including the code M712. Here, the code M712 is information indicating that the message including the code M712 is the INF command. The target property M713 includes a property notified by the EMS 160.

(Management Method)

Hereinafter, a management method according to an embodiment will be described. Here, a case in which the predetermined format used for the communication between the PCS 130 (the communication device 132) and the EMS 160 is a format conforming to the ECHONET Lite scheme will be exemplified.

As illustrated in FIG. 9, in step S10, the EMS 160 receives a power control message (here, a forward power flow amount suppression message) from the external server 400. However, step S10 is not essential and may be omitted. Step S10 may be a step in which the EMS 160 determines that the reverse power flow from the storage battery 120 to the power grid 10 is temporarily permitted.

In step S11, the EMS 160 transmits a SET command to the PCS 130. The SET command is the above-described permission message. The SET command may include the above-described condition designation message. As described above, the EMS 160 may transmit the permission message and the condition designation message by separate SET commands.

In step S12, the PCS 130 transmits, to the EMS 160, a SET response command corresponding to the SET command.

In step S13, the PCS 130 switches the operation of the storage battery 120 from the operation of the first state to the operation of the second state.

In step S14, the PCS 130 detects that a predetermined condition is satisfied, regardless of whether switching from the operation of the second state to the operation of the first state is instructed. As described above, the predetermined condition may be that the time for which the storage battery 120 continues the operation of the second state reaches a predetermined time, or may be that the cumulative output of the storage battery 120 reaches a predetermined output.

In step S15, the PCS 130 switches the operation of the storage battery 120 from the operation of the second state to the operation of the first state.

In step S16A, the EMS 160 transmits a GET command to the PCS 130. The GET command includes the operating state of the storage battery 120 as a property. For example, the operating state may be whether the storage battery 120 is operating in the first state or in the second state. The operating state may be a state in which charging/discharging criteria such as rapid charging, charging, discharging, standby, or testing are different.

In step S17A, the PCS 130 transmits, to the EMS 160, a GET response command corresponding to the GET command. The GET response command includes the operating state of the storage battery 120 as a property. Therefore, the EMS 160 can obtain a determination material as to whether the storage battery 120 is operating in the first state.

In the example illustrated in FIG. 9, the EMS 160 obtains a determination material as to whether the storage battery 120 is operating in the first state by transmitting the GET command and receiving the GET response command. However, the embodiment is not limited thereto.

For example, as illustrated in FIG. 10, in step S16B, the PCS 130 may transmit an INF command to the EMS 160 if the operation of the storage battery 120 is switched from the operation of the second state to the operation of the first state. The INF command includes the operating state of the storage battery 120 as a property. In FIG. 10, the processes from step S10 to step S15 are the same as those in FIG. 9.

In FIGS. 9 and 10, the PCS 130 switches the operation of the storage battery 120 from the operation of the first state to the operation of the second state in response to the reception of the permission message. However, the embodiment is not limited thereto. After the reception of the permission message, the PCS 130 may switch the operation of the storage battery 120 from the operation of first state to the operation of the second state in response to reception of a message instructing the discharge of the storage battery 120.

(Operation and Effect)

In the embodiment the EMS 160 transmits the permission message to the PCS 130. According to such a configuration, it is possible to temporarily permit the reverse power flow from the storage battery 120 to the power grid 10.

In the embodiment even when switching from the operation of the second state to the operation of the first state is not instructed, if a predetermined condition is satisfied, the storage battery 120 stops the operation of the second state under the control of the PCS 130. According to such a configuration, when using the storage battery 120 in which the reverse power flow is not originally permitted, it is possible to reduce a situation in which the second state in which the reverse power flow is permitted is improperly continued. For example, even when switching from the operation of the second state to the operation of the first state is not performed for some reason, the operation of the second state can be appropriately stopped.

[Modification 1]

Hereinafter, modification 1 of the embodiment will be described. A difference from the embodiment will be mainly described below.

In the embodiment even when switching from the operation of the second state to the operation of the first state is not instructed, if a predetermined condition is satisfied, the storage battery 120 stops the operation of the second state under the control of the PCS 130. On the other hand, in modification 1, even when the prescribed condition is not satisfied, if switching from the operation of the second state to the operation of the first state is instructed, the storage battery 120 stops the operation of the second state under the control of the PCS 130.

(Management Method)

Hereinafter, a management method according to modification 1 will be described. Here, a case in which the predetermined format used for the communication between the PCS 130 (the communication device 132) and the EMS 160 is a format conforming to the ECHONET Lite scheme will be exemplified.

As illustrated in FIG. 11, in step S20, the EMS 160 receives a power control message (here, a forward power flow amount suppression message) from the external server 400. However, step S20 is an option, and step S20 may be a step in which the EMS 160 determines that the reverse power flow from the storage battery 120 to the power grid 10 is temporarily permitted.

In step S21, the EMS 160 transmits a SET command to the PCS 130. The SET command is the above-described permission message. The SET command may include the above-described condition designation message. As described above, the EMS 160 may transmit the permission message and the condition designation message by separate SET commands.

In step S22, the PCS 130 transmits, to the EMS 160, a SET response command corresponding to the SET command.

In step S23, the PCS 130 switches the operation of the storage battery 120 from the operation of the first state to the operation of the second state.

In step S24, the EMS 160 transmits a SET command to the PCS 130. The SET command is a message instructing switching from the operation of the second state to the operation of the first state.

In step S25, the PCS 130 transmits, to the EMS 160, a SET response command corresponding to the SET command.

In step S26, even when the predetermined condition is not satisfied, the PCS 130 switches the operation of the storage battery 120 from the operation of the second state to the operation of the first state.

In step S27A, the EMS 160 transmits a GET command to the PCS 130. The GET command includes the operating state of the storage battery 120 as a property. For example, the operating state may be whether the storage battery 120 is operating in the first state or in the second state. The operating state may be a state in which charging/discharging criteria such as rapid charging, charging, discharging, standby, or testing are different.

In step S28A, the PCS 130 transmits, to the EMS 160, a GET response command corresponding to the GET command. The GET response command includes the operating state of the storage battery 120 as a property. Therefore, the EMS 160 can obtain a determination material as to whether the storage battery 120 is operating in the first state.

In the example illustrated in FIG. 11, the EMS 160 obtains a determination material as to whether the storage battery 120 is operating in the first state by transmitting the GET command and receiving the GET response command. However, modification 1 is not limited thereto.

For example, as illustrated in FIG. 12, in step S27B, the PCS 130 may transmit an INF command to the EMS 160 if the operation of the storage battery 120 is switched from the operation of the second state to the operation of the first state. The INF command includes the operating state of the storage battery 120 as a property. In FIG. 12, the processes from step S20 to step S26 are the same as those in FIG. 11.

In modification 1, the instruction to switch from the operation of the second state to the operation of the first state is performed by a message transmitted from the EMS 160 to the PCS 130. However, modification 1 is not limited thereto. The instruction to switch from the operation of the second state to the operation of the first state may be performed by a user operation. The instruction to switch from the operation of the second state to the operation of the first state may be an instruction to change to the operation mode in which the distributed power supply does not output power from itself, and may be an instruction to change to the operation mode to wait. For example, the storage battery 120 may interpret the instruction to change the operation mode, such as charging to the storage battery 120 or waiting, as the instruction to switch from the operation of the second state to the operation of the first state.

[Modification 2]

Hereinafter, modification 2 of the embodiment will be described. A difference from the embodiment will be mainly described below.

In the embodiment, the condition designation message designating the predetermined condition for stopping the operation of the second state is transmitted from the EMS 160 to the PCS 130. On the other hand, in modification 2, the permission message is associated with the time when the storage battery 120 continues the operation of the second state. The EMS 160 repeats the transmission of the permission message according to the time associated with the permission message. Therefore, the transmission of the condition designation message is unnecessary.

(Management Method)

Hereinafter, a management method according to modification 2 will be described. Here, a case in which the predetermined format used for the communication between the PCS 130 (the communication device 132) and the EMS 160 is a format conforming to the ECHONET Lite scheme will be exemplified.

As illustrated in FIG. 13, in step S30, the EMS 160 receives a power control message (here, a forward power flow amount suppression message) from the external server 400. However, step S30 is an option, and step S30 may be a step in which the EMS 160 determines that the reverse power flow from the storage battery 120 to the power grid 10 is temporarily permitted.

In step S31, the EMS 160 transmits a SET command to the PCS 130. The SET command is the above-described permission message.

In step S32, the PCS 130 transmits, to the EMS 160, a SET response command corresponding to the SET command.

In step S33, the PCS 130 switches the operation of the storage battery 120 from the operation of the first state to the operation of the second state.

In step S34, the EMS 160 transmits a SET command to the PCS 130 before the time associated with the permission message expires. The SET command is the above-described permission message.

In step S35, the PCS 130 transmits, to the EMS 160, a SET response command corresponding to the SET command.

That is, if it is desired to continue the operation of the second state, the EMS 160 repeats the transmission of the permission message (SET command) before the time associated with the permission message expires. On the other hand, if it is desired to stop the operation of the second state, the transmission of the permission message (SET command) is stopped.

In step S36, the PCS 130 switches the operation of the storage battery 120 from the operation of the second state to the operation of the first state in response to the expiration of the time associated with the permission message.

In step S37A, the EMS 160 transmits a GET command to the PCS 130. The GET command includes the operating state of the storage battery 120 as a property. For example, the operating state may be whether the storage battery 120 is operating in the first state or in the second state. The operating state may be a state in which charging/discharging criteria such as rapid charging, charging, discharging, standby, or testing are different.

In step S38A, the PCS 130 transmits, to the EMS 160, a GET response command corresponding to the GET command. The GET response command includes the operating state of the storage battery 120 as a property. Therefore, the EMS 160 can obtain a determination material as to whether the storage battery 120 is operating in the first state.

In the example illustrated in FIG. 13, the EMS 160 obtains a determination material as to whether the storage battery 120 is operating in the first state by transmitting the GET command and receiving the GET response command. However, modification 2 is not limited thereto.

For example, as illustrated in FIG. 14, in step S37B, the PCS 130 may transmit an INF command to the EMS 160 if the operation of the storage battery 120 is switched from the operation of the second state to the operation of the first state. The INF command includes the operating state of the storage battery 120 as a property. In FIG. 14, the processes from step S30 to step S36 are the same as those in FIG. 13.

In modification 2, the PCS 130 and the EMS 160 have a timer that counts the time associated with the permission message. For example, the PCS 130 activates the timer in response to the reception of the SET command (permission message), and the EMS 160 activates the timer in response to the transmission of the SET command (permission message). However, modification 2 is not limited thereto. The PCS 130 may activate the timer in response to switching to the operation of the second state. The EMS 160 may activate the timer in response to the receipt of the SET response command.

As described above, in modification 2, the predetermined condition may be regarded as not receiving an (n+1)th permission message until a time associated with an nth permission message expires.

[Modification 3]

Hereinafter, modification 3 of the embodiment will be described. A difference from the embodiment will be mainly described below.

In modification 3, prior to the transmission of the permission message from the EMS 160 to the PCS 130, a message (hereinafter, switching capability message) indicating whether switching between the first state and the second state is permitted is transmitted from the PCS 130 to the EMS 160. In an ECHONET Lite scheme, for example, an instance list can be used as the switching capability message. Whether the switching between the first state and the second state is permitted is determined by one of the capacity of the storage battery 120 and the contract of the storage battery 120.

The capacity of the storage battery 120 is information indicating whether it has a voltage rise suppression function (AVR; automatic voltage regulator) necessary for permitting a reverse power flow. The EMS 160 transmits the permission message to the storage battery 120 that has the AVR function. On the other hand, the EMS 160 does not transmit the permission message to the storage battery 120 that does not have the AVR function and has only a reverse power prevention function (RPR; reverse power relay).

The contract of the storage battery 120 is a contract between a business operator such as a power generation company, a power transmission/distribution company, or a retailer and a user of the storage battery 120. The EMS 160 transmits the permission message to the storage battery 120 that has a contract that allows the temporary permission of the reverse power flow. The EMS 160 does not transmit the permission message to the storage battery 120 that does not have a contract that allows the temporary permission of the reverse power flow.

(Management Method)

Hereinafter, a management method according to modification 3 will be described. Here, a case in which the predetermined format used for the communication between the PCS 130 (the communication device 132) and the EMS 160 is a format conforming to the ECHONET Lite scheme will be exemplified.

As illustrated in FIG. 15, in step S40, the EMS 160 receives an instance list from the PCS 130. The instance list includes the above-described switching capability message. Although it is not particularly limited, a timing at which the PCS 130 transmits the instance list may be a timing at which the PCS 130 is connected to the EMS 160, may be a timing at which the power of the PCS 130 is turned on, or may be a timing at which the power of the storage battery 120 is turned on.

In FIG. 15, although the process illustrated in FIG. 9 is exemplified as the process subsequent to the transmission of the SET command (permission message), the processes after transmitting the SET command (permission message) may be the processes illustrated in FIGS. 10 to 14.

Other Embodiments

Although the present disclosure has been described with reference to the above-described embodiments, it should not be understood that the description and drawings constituting a part of this disclosure limit the present disclosure. From this disclosure, various alternative embodiments, examples, and operational technologies will become apparent to those skilled in the art.

In the embodiment, the case in which the predetermined format used for the communication between the communication device 132 and the EMS 160 is the format conforming to the ECHONET Lite scheme has been described. However, the embodiment is not limited thereto. The predetermined format may be a format standardized as a format used in the facility 100.

In the embodiment, the PCS 130 (multi PCS) for controlling the outputs of the solar cell 110 and the storage battery 120 is illustrated. However, the embodiment is not limited thereto. The PCS 130 may be a PCS that controls the solar cell 110 or a PCS that controls the output of the storage battery 120.

In the embodiment, the display device 170 is, for example, a smartphone, a tablet, a television, or a dedicated terminal. However, the embodiment is not limited thereto. The display device 170 may be a remote controller for operating the conversion device 131. The remote controller may be considered to be part of the PCS 130.

In the embodiment, the case in which the first communication unit 132A and the second communication unit 132B have separate configurations has been described, but the first communication unit 132A and the second communication unit 132B may be integrally configured. That is, the first communication unit 132A may also serve as the second communication unit 132B.

In the embodiment, the storage battery 120 is exemplified as the distributed power supply that operates in a state in which the reverse power flow from the facility 100 to the power grid 10 is not permitted. However, the embodiment is not limited thereto. The distributed power supply that operates in a state in which the reverse power flow is not permitted may be a distributed power supply other than the storage battery 120, such as the solar cell 110 and the fuel cell.

In a case in which the reverse power flow amount is reduced by receiving the command for suppressing the reverse power flow amount when the power generated by the distributed power supply such as the solar cell 110, the fuel cell, or the storage battery 120 is reversely flowing, any one of the above-described embodiment, modification 1, modification 2, and modification 3 may be applied. Specifically, the distributed power supply that operates in the first state in which the reverse power flow is not permitted by executing the output suppression message may operate in the second state in which the reverse power flow is temporarily permitted.

If the distributed power supply is the solar cell 110, it is possible to assume the output suppression state as the first state in which the reverse power flow is not permitted, and it is assumed that some of the facilities 100 are changed to the second state in which the reverse power flow is permitted by relaxing the output suppression state according to the situation of the power grid 10. In this case, it is possible to set the second state so as to enable the reverse power flow exceptionally while maintaining the output suppression state of the facility 100. For the change from the first state to the second state, as described above, the permission message or the condition setting message can be used.

In addition, if the solar cell 110 is in the output suppression state, the storage battery 120 in the first state in which the reverse power flow is not permitted may be switched to the second state in principle.

In the embodiment, various messages are transmitted from the EMS 160 to the PCS 130. However, the embodiment is not limited thereto. Various messages may be directly transmitted from the EMS 160 to the storage battery 120.

Although not particularly mentioned in the embodiment, the second state is merely a state in which the reverse power flow is permitted, and thus the reverse power flow is not always necessarily performed in the second state. For example, if the remaining power amount of the storage battery 120 is smaller than a threshold value, the storage battery 120 may not be discharged even in the second state.

The entire contents of Japanese Patent Application No. 2016-127625 (filed on Jun. 28, 2016) are incorporated herein by reference.

The invention claimed is:

1. A management method, comprising:
   transmitting, to a management device from a distributed power supply which operates in a first state in which a reverse power flow from a facility to a power grid is not permitted, a switching capability message indicating whether the distributed power supply has a capability of switching between the first state and a second state in which the reverse power flow is permitted;
   receiving from the management device, by the distributed power supply which operates in the first state, a permission message permitting the distributed power supply to operate in the second state, when the distributed power supply has the capability of switching between the first state and the second state;
   switching, by the distributed power supply, from the operation of the first state to the operation of the second state, in response to receiving the permission message; and
   switching, by the distributed power supply, from the operation of the second state to the operation of the first state, even when switching from the operation of the second state to the operation of the first state is not instructed, in response to a predetermined condition being satisfied.

2. The management method according to claim 1, further comprising:
   transmitting a message designating the predetermined condition from the management device to the distributed power supply.

3. The management method according to claim 1, wherein the predetermined condition is that a time for which the distributed power supply continues the operation of the second state reaches a predetermined time.

4. The management method according to claim 1, wherein the predetermined condition is that a cumulative output of the distributed power supply reaches a predetermined output.

5. The management method according to claim 1, further comprising:
   repeating transmission of the permission message to the distributed power supply, by the management device, according to a time associated with the permission message when the permission message is associated with a time for which the distributed power supply continues the operation of the second state.

6. The management method according to claim 1, further comprising:
   switching, by the distributed power supply, from the operation of the second state to the operation of the first state, even when the predetermined condition is not satisfied, in response to an instruction to switch from the operation of the second state to the operation of the first state.

7. The management method according to claim 6, wherein the instruction to switch from the operation of the second state to the operation of the first state is issued by a message or user operation transmitted from the management device to the distributed power supply.

8. The management method according to claim 1, further comprising
   transmitting a message indicating whether switching between the first state and the second state is permitted from the distributed power supply to the management device.

9. The management method according to claim 8, wherein permission for the switching between the first state and the second state is determined by the capability of the distributed power supply and a contract of the distributed power supply.

10. The management method according to claim 1, further comprising:
    switching, by the distributed power supply being a storage battery device, from the operation of the first state to the operation of the second state in response to reception of a message instructing a discharge of the storage battery device.

11. A distributed power supply configured to operate in a first state in which a reverse power flow from a facility to a power grid is not permitted, the distributed power supply comprising:
    a transmitter configured to transmit, to a management device, a switching capability message indicating whether the distributed power supply has a capability of switching between the first state and a second state in which the reverse power flow is permitted;
    a receiver configured to receive, from the management device, a permission message permitting operation in the second state, when the distributed power supply has the capability of switching between the first state and the second state; and
    a controller configured
      to switch from the operation of the first state to the operation of the second state in response to receiving the permission message, and
      to switch from the operation of the second state to the operation of the first state, even when switching from the operation of the second state to the operation of the first state is not instructed, in response to a predetermined condition being satisfied.

12. A management system, comprising:
    a distributed power supply configured to operate in a first state in which a reverse power flow from a facility to a power grid is not permitted, and
    a management device,
    wherein
    the distributed power supply is configured to transmit, to the management device, a switching capability message indicating whether the distributed power supply has a capability of switching between the first state and a second state in which the reverse power flow is permitted,
    the management device is configured to transmit to the distributed power supply a permission message permitting the distributed power supply to operate in the second state, when the distributed power supply has the capability of switching between the first state and the second state, and
    the distributed power supply is further configured
      to switch from the operation of the first state to the operation of the second state in response to receiving the permission message, and
      to switch from the operation of the second state to the operation of the first state, even when switching from the operation of the second state to the operation of the first state is not instructed, in response to a predetermined condition being satisfied.

13. The management system of claim 12, wherein
the distributed power supply is further configured to
switch from the operation of the second state to the operation of the first state, even when the predetermined condition is not satisfied, in response to an instruction to switch from the operation of the second state to the operation of the first state.

14. The management system of claim 12, wherein the predetermined condition is that a time for which the distributed power supply continues the operation of the second state reaches a predetermined time.

15. The management system of claim 12, wherein the management device is further configured to transmit a message designating the predetermined condition to the distributed power supply.

16. The management system of claim 12, wherein the distributed power supply is further configured to receive a message designating the predetermined condition from the management device.

17. The management system of claim 12, wherein the management device is further configured to repeat the transmission of the permission message according to a time associated with the permission message when the permission message is associated with a time for which the distributed power supply continues the operation of the second state.

18. The management system of claim 12, wherein the distributed power supply is further configured to transmit a message indicating that switching between the first state and the second state is permitted to the management device when the distributed power supply has a voltage rise suppression function.

19. The management system of claim 12, wherein the distributed power supply is further configured to transmit a message indicating that switching between the first state and the second state is not permitted to the management device when the distributed power supply only has a reverse power prevention function.

* * * * *